United States Patent [19]

Williams

[11] Patent Number: 4,738,069

[45] Date of Patent: Apr. 19, 1988

[54] TRIM ASSEMBLY

[75] Inventor: James Williams, Fair Haven, Mich.

[73] Assignee: Riverside International Inc., Troy, Mich.

[21] Appl. No.: 2,317

[22] Filed: Jan. 12, 1987

[51] Int. Cl.⁴ .............................................. B60J 1/00
[52] U.S. Cl. ........................................ 52/658; 52/716; 403/402
[58] Field of Search .................... 52/288, 658, 716; 403/402; 49/479; 40/152, 155; 296/84 D, 146

[56] References Cited

U.S. PATENT DOCUMENTS

| | | | |
|---|---|---|---|
| 3,756,636 | 9/1973 | Jackson | 403/402 |
| 4,010,573 | 3/1977 | Andrzejewski | 52/716 |
| 4,205,470 | 6/1980 | Kapnek | 403/402 X |
| 4,220,681 | 9/1980 | Narita | 52/716 X |
| 4,387,128 | 6/1983 | Emms et al. | 52/658 |
| 4,516,341 | 5/1985 | Jenkins | 40/152 |
| 4,685,839 | 8/1987 | Plater et al. | 403/402 X |

FOREIGN PATENT DOCUMENTS

| | | | |
|---|---|---|---|
| 1389075 | 4/1975 | United Kingdom | 52/288 |
| 2026125 | 1/1980 | United Kingdom | 403/402 |

*Primary Examiner*—J. Karl Bell
*Attorney, Agent, or Firm*—Cullen, Sloman, Cantor, Grauer, Scott & Rutherford

[57] ABSTRACT

A pair of angularly related interconnected steel trim elements having a mitre joint therebetween have a continuous layer of plastic material bonded upon one side of the trim elements. A corner connector reinforcement sheet of plastic material is positioned upon the plastic layer, spans the mitre joint and adjacent portions of the trim elements. A layer of adhesive upon one side of the connector sheet is in surface engagement with the plastic layer providing a rigid connection therebetween. The method of making a window frame trim assembly comprises bonding a layer of plastic material upon one side of a metallic strip, rolling its opposed longitudinal edges into transverse C-shape defining an elongated channel, cutting a series of spaced notches transversly of the channel through one edge and across to the other edge, defining a series of interconnected trim elements and successively bending adjacent trim elements into engagement closing the notches to form a series of spaced mitre joints. Additional steps include applying a layer of adhesive material to one side of a plurality of corner connector reinforcement sheet and successively applying a corner connector sheet into engagement with the plastic layer over and spanning the mitre joints and adjacent portions of the trim elements providing rigid connections at the mitre joints.

7 Claims, 1 Drawing Sheet

TRIM ASSEMBLY

FIELD OF THE INVENTION

The present invention relates to trim assemblies and more particularly trim assemblies for vehicle window frames and the means for securing and reinforcing mitre joints at the corners thereof.

BACKGROUND OF THE INVENTION

Heretofore in making door and window frame trim assemblies with mitre joints, there has long existed the difficulty of fixedly securiing the mitre joint against displacement or separation of the angularly related trim elements which define such joint. Various efforts have been made to provide a suitable means of anchoring and securing these joints. Anchor blocks have been tried but have been found impractical because they block the continuity of the continuous channelling defined in the trim elements which make up the respective mitre joints of the frame assembly. Screws and fasteners have been tried but have been found ineffective and do not hold properly or function well due to thinness of the metal strips which make up the channel elements at the mitre joint forming a part of the window frame trim assembly. Magnetic spanners have been tried for the mitre joints and have been found costly and ineffective in providing a positive interlock between the adjacent trim elements at the mitre joint.

SUMMARY OF THE INVENTION

An important feature of the present invention is to provide Nylon sheet cyanoacrylate joint reinforcement for supporting vinyl lined stainless steel door frame trim mitre joints, though not limited to that application. The present reinforcement assembly may be used to meet any other trim or fitted joint reinforcement requirements.

An important feature is to provide a mitre joint reinforcement which utilizes a thin fitted Nylon sheet held onto the mitre joint in mechanical sheer configuration by cured adhesive, as for example cyanoacrylate adhesive.

Another feature is to provide a pair of angularly related interconnected steel or stainless steel trim elements having a mitre joint therebetween with a continuous layer of a plastic material, such as polyvinyl chloride, bonded upon and along one side of the trim elements. A generally V-shaped corner connector reinforcement sheet of a plastic material, as for example Nylon, extends over and spans the mitre joint and adjacent portions of the trim elements and is adhesively connected thereto.

As an important feature the V-shaped corner connector reinforcement sheets are oversize with respect to the angularly related interconnected steel trim elements and are snapped into place covering the mitre joint under tension for self-biasing the connector sheet and the adhesive layer against the mitre joint.

Another important feature is to roll form the opposed longitudinal edges of the metal strip defining the trim elements so that they are inturned and are of transverse C-shape to define a channel and wherein a first plastic layer, such as polyvinyl chloride, extends along the interior of the channel including the inturned edges.

As another feature of a plurality of space apertures are formed through the connector sheet so that the adhesive applied to the sheet bleeds through the apertures to form a mechanical interlock with the connector. The connector sheet spans, is tightly secured to and reinforces the adjacent trim elements which define the mitre joint for a rigid connection.

It is an important feature to provide a window frame trim assembly for a vehicle to comprise a series of angularly related interconnected trim elements constructed of a steel material such as stainless steel, of hollow generally rectangular shape and with mitre joints between the ends of the adjacent trim elements. A continuous layer of a first plastic material is bonded upon and along one side of the trim elements and the corner connector reinforcement sheets are generally V-shape constructed of a second plastic material such as Nylon though not limited thereto, and are snapped positioned into the channel over the first plastic layer overlying and spanning each mitre joint and adjacent portions of the trim elements. A layer of adhesive is applied to the respective connector sheets in surface engagement with the plastic layer upon the trim elements to provide when cured a rigid connection therebetween at each of the mitre joints.

The present invention further includes a method of making a window frame trim assembly for a vehicle which comprises the steps of bonding a layer of a first plastic material upon and along one side of an elongated metallic strip, rolling the opposed longitudinal edges of the strip into transverse C-shape defining an elongated channel, cutting a series of longitudinally spaced notches transversely of and along the length of the channel through one edge and across to the other edge and wherein the notches are of varying angles and define a series of interconnected trim elements of a length corresponding to the dimensions of the window frame. Further steps include successively bending the common ends of adjacent pairs of trim elements into snug engagement closing the notches to form a series of spaced mitre joints and forming said trim elements into a hollow generally rectangular shape. Further steps include applying a layer of adhesive material to one side of a plurality of corner connector reinforcement sheets and successively applying a generally V-shaped corner connector sheet and its adhesive layer by snap attachment into surface engagement with the first plastic layer respectively extending over and spanning the mitre joints and adjacent portions of the trim elements, and upon curing providing a rigid connection between the trim elements and the mitre joints.

These and other features and objects will be seen from the following specification and claims in conjunction with the appended drawings.

It will be understood that the above drawing illustrates merely a preferred embodiment of the invention, and that other embodiments are contemplated within the scope of the claims hereafter set forth.

DETAILED DESCRIPTION OF THE EMBODIMENT OF THE INVENTION

Figure 1:
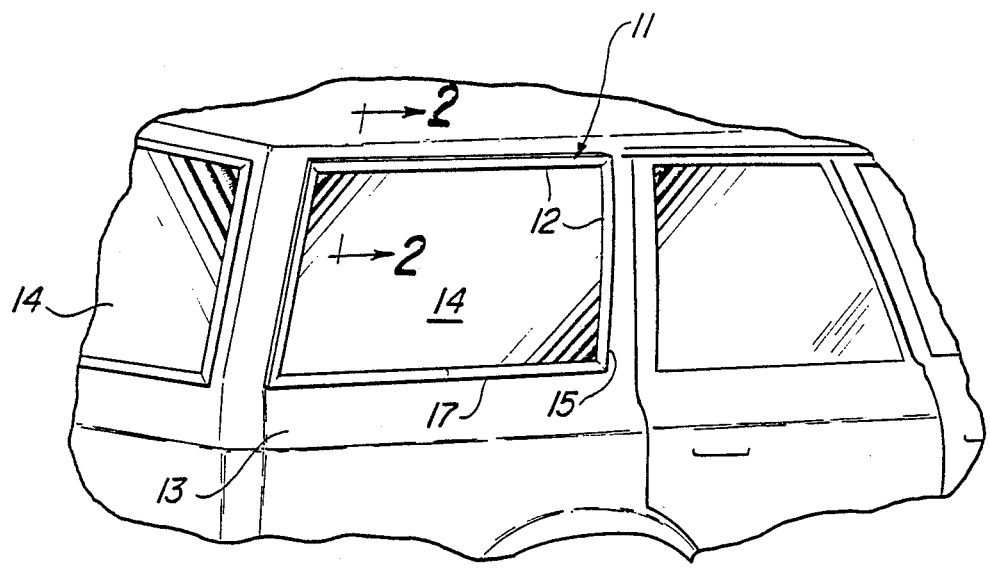
FIG. 1 is a fragmentary perspective view of the vehicle body showing a window frame trim assembly in accordance with the present invention.

Referring to the drawing, a door or window frame trim assembly is generally indicated at 11, FIG. 1, and includes a series of interconnected angularly related trim elements 12 conventionally snapped onto a window or door frame 13 of a vehicle body, surrounding the window, windshield, or rear window thereof.

Figures 2, 3:
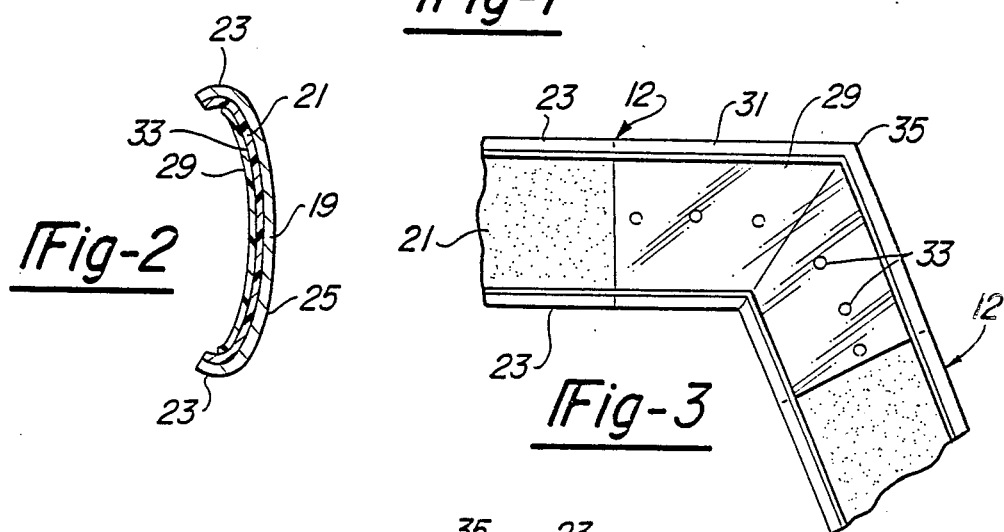
FIG. 2 is a transverse section taken in the direction of arrows 2—2 of FIG. 1, upon an increased scale.
FIG. 3 is a fragmentary side elevational view of one mitre joint forming a part of the window frame assembly shown in FIG. 1, on an increased scale.

The door or window trim frame assembly includes a series of spaced mitre joints 15, one of which is shown on an enlarged scale from the reverse side in FIG. 3 and wherein the respective ends 17 of the trim assembly are overlapped and interlocked in a conventional manner.

In accordance with the present method of making a window frame trim assembly for a vehicle are the steps of providing a metallic strip preferrably of steel or stainless steel from coiled stock and bonding a layer 21 of plastic material, as for example polyvinyl chloride, upon and along one side of the elongated strip. The opposed longitudinal edges 23 are rolled into transverse C-shape to define a longitudinal channel, FIG. 4, with its exterior surface convex at 25, FIG. 2.

A further step includes the successive cutting of a series of longitudinally spaced angular notches 27 transversely of and along the length of the channel through one edge 23 and across to the other edge. The corner defining notches 27 are of varying angles depending upon the preselected angle of the window frame to which the present trim frame assembly is to be applied. This defines a series of interconnected trim elements 12 when folded as in FIG. 1 to correspond to the dimensions of window frame 13. An additional step includes successive bending of the common ends of adjacent pairs of trim elements 12 in the shape shown in FIG. 4 to the shape shown in FIG. 3. The common ends of adjacent pairs of trim elements 12 are in snug engagement closing notches 27 to form a series of spaced mitre joints 15, FIGS. 1 and 3, forming the trim elements into a hollow generally rectangular shape, FIG. 1.

Figures 4, 5:
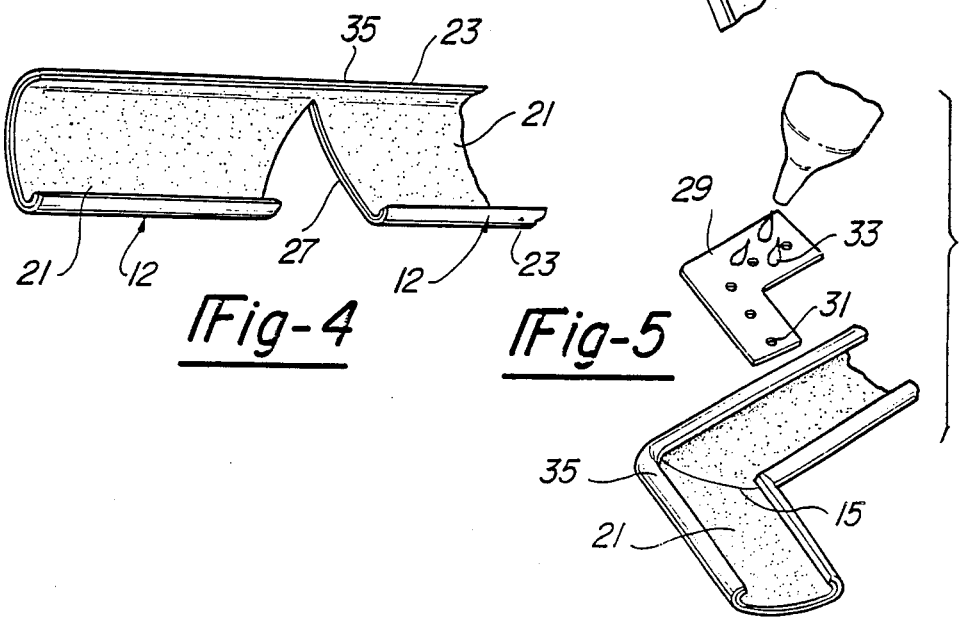
FIG. 4 is a fragmentary perspective view of a portion of the channel stock with a V-shaped notch cut thereinto for the formation of the mitre joint shown in FIG. 3.
FIG. 5 is a perspective of the mitre joint made from the notched channel shown in FIG. 4 onto which is snap assembled thereover a V-shaped corner connector reinforcement sheet for adhesion over the plastic coated trim elements and the mitre joint.

As a further step there is applied a layer of adhesive material to one side of a plurality of generally V-shaped corner connector reinforcement sheets 29, FIG. 5. These sheets are preferably of a plastic material and in the illustrative embodiment are constructed of Nylon.

The angularity of the notches 27 varies approximately between 77° and 144°. The thickness of the connector sheets is in the range of 0.010 to 0.015 inches and the respective elements of the corner connector sheet have a width of approximately 0.600 inches. A series of centrally arranged transverse apertures 31 are formed through the respective corner connector sheets 29. A layer of adhesive 33 applied over the entire one side of the corner connector sheet in FIG. 5. As a further step the respective corner connector sheets 29 are successively snap applied inverted over the adjacent mitre joint 15, FIG. 5. The connectors are oversized with respect to the corresponding channel and applied to the polyvinyl chloride layer 21 so as to span the mitre joint 15 and adjacent portions of the registering trim elements 12, FIG. 3.

The corresponding generally V-shaped corner insert connector reinforcement sheets 29 with adhesive 33 applied thereto are snap assembled over the respective mitre joints 15 and adjacent portions of the trim elements. Said sheets upon curing over a limited period or drying up to one hour, for illustration, provide a rigid connection between the trim elements and the mitre joints 15. The apertures 31 provide a means by which some of the adhesive material bleeds through the corresponding apertures for a mechanical interlock with the connector sheet when dried.

Any suitable adhesive may be employed which is compatible with the plastic layer 21, such as the polyvinyl chloride employed, and the corner insert connector sheet 29 of a plastic material, in the illustrative embodiment Nylon. In the present illustrative embodiment there is employed suitable adhesive manufactured and sold by 3M Company identified as CA-40 CYANOACRYLATE which has been found to provide a very firm bond between the connector sheets and the adjacent portions of the trim assembly at the mitre joints 15. This provides the unit door or window frame trim assembly 11, FIG. 1.

The window frame trim assembly 11 is reinforced by the longitudinal edges 23 transversely rolled into C-shape in the steel stock which defines the trim elements for the frame trim assembly.

As shown in FIG. 4, the trim elements 12 despite the transverse notch 27 remain interconnected at 35 to thereby define a hinge connection therebetween to facilitate the assembly of the mitre joint and the complete trim assembly when the respective trim elements 12 have been rotated substantially in a unit plane into engaging registry, FIGS. 3 and 5. The remaining free edges that define the notch including the notched rolled edge 23 are in cooperative engaging registry for reinforcing the mitre joint.

The present snap-in corner connector reinforcement sheets 29 are relatively thin as for example 0.010 to 0.015 inches thick. They provide an effective rigid reinforcement for the mitre joint and at the same time do not obstruct the channel which remains a continuous channel throughout the frame trim assembly 11. This facilitates the snap mounting thereof upon a vehicle body in a manner well known and conventional in the art. The present snap-in reinforcement sheets thus do not obstruct the channel at the mitred corners as other connectors did in the prior art.

With the stock and its transversely rolled edges 23, the maximum width of the stock strip is 0.575 inches, for illustration. Since the width of the elements of the corner connector sheet 29 is 0.600 inches, they are oversized with respect to the channel. The corner connector sheets are mechanically snapped into place and are self-securing as shown in FIG. 2. Once assembled into position, they are self-biasing so as to normally urge the connector sheet and its adhesive layer 33 into snug registry with adjacent portions of the trim elements which define each mitre joint 15. Thus the assembly of the snap-in reinforcement sheets is maintained during the curing or drying process for the cement or other adhesive employed.

In the illustrative embodiment the present door or window frame trim assembly 11 is constructed of stainless steel, though steel or any other metal stock may be employed. While the continuous layer of plastic material bonded along one side of the trim elements is preferably a polyvinyl chloride, it is contemplated that other plastic materials could be employed of a uniform thickness. Similarly with respect to the corner connector sheets 29, it has been found that Nylon sheets are most effective. It is contemplated that other plastic sheets could be employed which are sufficiently compatible with te adhesive employed so as to provide a firm interlock between the respective sheets and the plastic layer 21 applied to the channels.

While the corner connector sheets may be employed without apertures 31, it has been found that their use improves the bond between the connector sheet and the mitre joint primarily because the bleeding of adhesive through the respective apertures 31 improves the interlock of the cement between the mitre joint and the connector sheet.

In the present method the reinforcement of the mitre joints is completed when the adhesive 33 applied to the connector sheets 29 has properly dried. This may occur over a period of 15 minutes to one hour depending upon the nature of the plastic materials employed and the nature and consistency of the adhesive used. The fact that the corner connector is oversized with respect to the channel and the snap-in assembly thereof into the mitre joint such as shown in FIG. 5 provides a means by which there is a self-biasing of the corner connector sheet into position with the adhesive layer 33 thereon in firm registry with the adjacent portions of the trim elements 12 which define mitre joint 15.

Having described my invention, reference should now be had to the following claims.

I claim:

1. A window frame trim assembly for a vehicle, comprising:
   a series of angularly related interconnected trim elements constructed of a steel material of generally hollow rectangular shape with mitre joints between the ends of adjacent trim elements and with opposed longitudinal side edges of said trim elements being inturned and of transverse C-shape to define a continuous channel;
   a continuous layer of a first plastic material bonded upon and along one side of said trim elements;
   a corner connector reinforcement sheet constructed of a second plastic material positioned upon said first plastic layer on an inside surface of said continuous channel overlying and spanning each mitre joint and adjacent portions of said trim elements between said opposed longitudinal side edges;
   said connector sheet being oversized with respect to the continuous channel of said trim elements;
   and a layer of adhesive upon one side of said connector sheets in surface engagement with said plastic layer upon said trim elements providing a rigid connection therebetween at each of said mitre joints, whereby said connector sheet may be snapped thereinto under tension for self-biasing said connector sheet and adhesive layer against said mitre joints.

2. In the trim assembly of claim 1, said first plastic material being polyvinyl chloride; and said second plastic material being Nylon.

3. In the trim assembly of claim 1, there being a plurality of spaced apertures through the connector sheet, said adhesive bleeding through said apertures to form a mechanical interlock with said connector sheet.

4. In the trim assembly of claim 1, said trim elements being constructed of stainless steel.

5. A method of making a window frame trim assembly for a vehicle comprising the steps of:
   (1) bonding a layer of plastic material upon and along one side of an elongated metallic strip;
   (2) rolling the opposed longitudinal edges of said strip into transverse C-shape defining an elongated channel;
   (3) cutting a series of longitudinally spaced notches transversely of and along the length of said channel through one edge and across to the other edge; said notches being at varying angles and defining a series of interconnected trim elements of a length corresponding to the dimensions of the window frame;
   (4) successively bending the common ends of adjacent pairs of trim elements into snug engagement closing said notches to form a series of spaced mitre joints and forming said trim elements into a hollow generally rectangular shape;
   (5) applying a layer of adhesive material to one side of a plurality of generally V-shaped oversized corner connector reinforcement sheets; and
   (6) successively applying the generally V-shaped oversized corner connector sheets and the adhesive layer into surface engagement on an inside surface of said channel with the first plastic layer upon said trim elements respectively and extending over and spanning said mitre joints and adjacent portions of said trim elements by snapping the connector sheets thereinto under tension for self-biasing each connector sheet and adhesive layer against said mitre joints, and upon curing providing a rigid connection between said trim elements and said mitre joints.

6. In the method of claim 5, the free ends of said strip being in alignment, overlapped and interlocked.

7. In the method of claim 5, said layer of plastic material being polyvinyl chloride, said reinforcement sheets being constructed of Nylon.

* * * * *